United States Patent [19]

McBrayer

[11] 4,388,420
[45] Jun. 14, 1983

[54] PROCESS FOR PREPARING A MICROCELLULAR POLYURETHANE FOAM WITH IMPROVED GREEN STRENGTH

[75] Inventor: Robert L. McBrayer, Lincoln Park, Mich.

[73] Assignee: BASF Wyandotte Corporation, Wyandotte, Mich.

[21] Appl. No.: 325,793

[22] Filed: Nov. 30, 1981

Related U.S. Application Data

[63] Continuation-in-part of Ser. No. 146,646, May 5, 1980, abandoned.

[51] Int. Cl.³ .................. C08G 18/14; C08G 18/18; C08G 18/24
[52] U.S. Cl. ................................ 521/127; 521/167; 521/108
[58] Field of Search ............... 521/115, 167, 127

[56] References Cited

U.S. PATENT DOCUMENTS

| | | | |
|---|---|---|---|
| 3,050,477 | 8/1962 | Smitter et al. | 260/2.5 |
| 3,112,281 | 11/1963 | Sromacki et al. | 521/167 |
| 3,471,416 | 10/1969 | Fijal | 521/167 |
| 3,476,933 | 11/1969 | Mendelsohn | 260/2.5 |
| 3,580,868 | 5/1971 | Diehr et al. | 521/118 |
| 3,620,986 | 11/1971 | Diehr et al. | 521/118 |
| 3,894,972 | 7/1975 | Narayan et al. | 521/107 |
| 3,922,238 | 11/1975 | Narayan et al. | 521/126 |
| 4,145,318 | 3/1979 | Ohashi et al. | 521/167 |
| 4,273,885 | 6/1981 | Dominguez et al. | 521/115 |

Primary Examiner—H. S. Cockeram
Attorney, Agent, or Firm—Joseph D. Michaels; Arnold S. Weintraub

[57] ABSTRACT

There is provided a process for preparing a microcellular foam with improved green strength properties comprising the step of reacting an organic polyisocyanate with polyalkylene ether polyol and from 1 to about 35 parts (by weight, per hundred parts of said polyol) of a chain extender in the presence of from about 0.1 to about 10.0 parts (by weight, per hundred parts of said polyol) of a compound selected from the group consisting of:

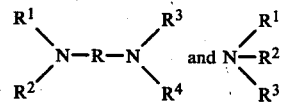

wherein:
(a) said polyol has an average functionality of from about 2 to about 8 and an average equivalent weight of from about 1000 to about 2700, and from about 0.8 to about 1.2 equivalents of said polyol are reacted per equivalent of isocyanate;
(b) R is a divalent alkylene radical containing from about 1 to about 4 carbon atoms; and
(c) $R^1$, $R^2$, $R^3$, and $R^4$ are independently selected from the group consisting of hydroxyalkyl containing from about 1 to about 4 carbon atoms and from about 1 to about 2 hydroxyl groups.

6 Claims, No Drawings

PROCESS FOR PREPARING A MICROCELLULAR POLYURETHANE FOAM WITH IMPROVED GREEN STRENGTH

CROSS REFERENCE TO RELATED APPLICATIONS

This application is a continuation-in-part application of copending U.S. patent application Ser. No. 146,646, filed May 5, 1980 abandoned for "Process for Preparing a Microcellular Polyurethane Foam With Improved Green Strength," the disclosure of which is hereby incorporated by reference.

BACKGROUND OF THE INVENTION

I. Field of the Invention

The present invention relates to a process for preparing a microcellular polyurethane foam with improved green strength. More particularly, the present invention relates to a process for preparing flexible polyurethane foams having improved green strength.

II. Description of the Prior Art

High density microcellular polyurethane foams are used by the automotive industry to prepare such molded parts as, e.g., fascia, air dams, fender flares, spoilers, and fender extensions. Many of these parts are quite complex in configuration; and molding of such parts can be difficult when the parts have wrap-arounds or undercuts. Problems occur on demold if the parts tear as they are pulled or ejected off of mold cores or cavities.

The propensity of a molded polyurethane part to show surface cracking if bent over sharply soon after demold is an indication of its "green strength." Ordinarily, the production suitability of a particular flexible microcellular polyurethane foam otherwise meeting the specific physical property requirements for a given application may be judged on the basis of its "green strength," i.e., the resistance to mechanical damage such as, tearing, non-recoverable stretching, or cracking at the time of demold. The degree of green strength required may be dependent on the complexity of the part produced. It is apparent that a simple flat part would not require the degree of green strength necessary for a complex shape with numerous cut-out sections, curves and undercuts. Hence, conversely, the poorer the green strength of a polyurethane foam, the more likely it is that said foam will be unsuitable for producing complex, molded parts.

The prior art has not provided a totally satisfactory solution to providing high density microcellular flexible foams with good green strength. Some of the relevant prior art of which the applicant is aware includes U.S. Pat. Nos. 3,580,868; 3,620,986; 3,894,912 and 3,922,238.

U.S. Pat. No. 3,580,868 teaches that catalysts prepared by reacting dimethylamine, formaldehyde, and phenols may be used to catalyze the polymerization of compounds which contain one or more isocyanate groups in the molecule. The patentees disclosed that the prior art " . . . amine components used cause the isocyanate polymerization to proceed insufficiently smoothly so that the product obtained is commercially unsatisfactory in every respect." (column 1, lines 60-64).

U.S. Pat. No. 3,620,986 discloses certain mononuclear Mannich bases of secondary amines, formaldehyde and phenols; it also discloses a process for the production of synthetic resins containing isocyanurate groups which comprises polymerizing an organic polyisocyanate in the presence of these Mannich bases. The patentees disclose that "the use of alkoxylated condensation products of amines . . . in the reaction of isocyanates . . . for the production of foams, is also known, although in these cases no substantial polymerisation of the isocyanate groups can be observed." (Column 1, lines 39-44).

U.S. Pat. No. 3,894,972 discloses a process for preparing rigid cellular foam compositions by condensing an organic polyisocyanate in the presence of a furfuryl alchohol and a tertiary amine.

U.S. Pat. No. 3,922,238 discloses a process for preparing rigid cellular foam compositions by condensing an organic polyisocyanate in the presence of a blowing agent, a polyol, and a catalyst system containing an alcohol, a tertiary amine trimerization catalyst, and a urethane catalyst.

Other art which may be deemed of interest hereto includes U.S. Pat. Nos. 3,050,477; 3,112,281; and 3,471,416. U.S. Pat. No. 3,050,477 teaches a polyurethane foam having uniform cell size which is achieved through the use of organosilane surfactants. The silanes may be used alone or in admixture with a diol modifier. The foams of the reference may be flexible, rigid or semi-rigid depending on the linearity or branching of the isocyanate and/or polyether reactant as well as the blowing agent. The blowing agents disclosed by the reference include the well-known halohydrocarbons as well as water or mixtures thereof. The reference further teaches the use of conventional tertiary amine catalysts as well as other organometallic catalysts. The catalyst is employed in an amount ranging from about 0.05 parts to about 3.0 parts by weight per hundred parts by weight of polyol.

U.S. Pat. No. 3,112,281 teaches the use of a tetra (polyoxypropylene) ethylene diamine as a polyol reactant in the preparation of polyurethane foams. The reference teaches that when using this polyol to manufacture flexible foam, it is employed along with silicone oils, water as a blowing agent, and a conventional tertiary amine catalyst.

U.S. Pat. No. 3,471,416 teaches a rigid polyurethane foam using a combination of polyols, including tetra (hydroxyalkyl) alkylene diamine and polyhydric alcohols, an organic polyisocyanate, a wetting agent, a blowing agent, and a specific amine catalyst mixture.

SUMMARY OF THE INVENTION

It is an object of this invention to provide a process for preparing a flexible high density microcellular polyurethane foam which has improved green strength and good physical properties.

In accordance with this invention, there is provided a process for preparing such a microcellular foam with improved green strength properties which comprises: reacting an organic polyisocyanate with polyalkylene ether polyol and from 1 to about 35 parts (by weight, per hundred parts of said polyol) of a chain extender in the presence of from about 0.1 to about 10.0 parts (by weight, per hundred parts of said polyol) of a compound selected from the group consisting of

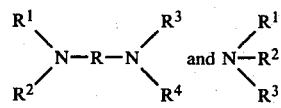

wherein:
(a) said polyol has an average functionality of from about 2 to about 8 and an average equivalent weight of from about 1000 to about 2700, and from about 0.8 to about 1.2 equivalents of said polyol are reacted per equivalent of isocyanate;
(b) R is a divalent alkylene radical containing from about 1 to about 4 carbon atoms; and
(c) $R^1$, $R^2$, $R^3$, and $R^4$ are independently selected from the group consisting of hydroxyalkyl containing from about 1 to about 4 carbon atoms and from about 1 to about 2 hydroxyl groups.

The preferred diamine is N,N,N', N'-tetrakis(2-hydroxypropyl)ethylenediamine and the preferred tertiary amine is triethanolamine. The amine compounds, which function to improve the green strength can be used alone or in admixture with other catalysts, such as organometallic and other tertiary amine catalysts commonly employed for urethane formation.

The flexible microcellular foams provided herein demonstrate improved green strength.

For a more complete understanding of the present invention, reference is made to the following detailed description and accompanying example.

DESCRIPTION OF THE PREFERRED EMBODIMENTS

In the present invention, certain amine compounds are used in the condensation reaction of an organic polyisocyanate with polyalkylene polyether polyol. The use of these compounds results in flexible microcellular polyurethane foams with improved green strength.

In the process of this invention, an organic polyisocyanate is reacted with a polyalkylene polyether polyol in the presence of certain green strength improving nitrogen compounds and a chain extender. Any suitable organic isocyanate may be used in the process of this invention. By way of illustration and not limitation, some of the isocyanates which may be used in this process include, for example, aromatic isocyanates such as 1-methylbenzene-2, 4-diisocyanate, 1-methylbenzene-2, 6-diisocyanate, 1-methoxybenzene-2, 4-diisocyanate, 1-chlorobenzene-2, 4-diisocyanate, 1-benzylbenzene-2, 6-diisocyanate, 2,6-diethylbenzene-1, 4-diisocyanate, diisopropylbenzene diisocyanates, triisopropylbenzene diisocyanates, 1,3-dimethoxybenzene-2, 4-diisocyanate, 1-nitrobenzene-2, 4-diisocyanate, technical mixtures of 2,4 and 2,6-toluene diisocyanates, m- and p-phenylene diisocyanates, m-xylylene diisocyanate, p-xylylene diisocyanate, naphthylene-1,5-diisocyanate, diphenylmethane-4,4-diisocyanate, diphenylmethane-2,2'-diisocyanate, diphenylmethane-4,2'-diisocyanate, 3,3'-dimethoxy-diphenylmethane-4,4'-diisocyanate, dimethyldiphenylmethane-4, 4'-diisocyanate, 3-methyldiphenylmethane-4,4'-biphenyl diisocyanate, 4,4'-diphenyl sulphone diisocyanate; aromatic diisocyanates which have been substituted by various substituents such as alkoxy-, nitro, chloro, or bromo-, chlorophenylene-2 ,4-diisocyanate, and the like. Thus, one may use aliphatic, cycloaliphatic, and araliphatic isocyanates such as, tetramethylene diisocyanate, pentamethylene diisocyanate, hexamethylene diisocyanate, 1,3-cyclopentylene diisocyanate, 1,4-cyclohexylene diisocyanate, 1,2-cyclohexylene diisocyanate, hexahydroxylylene diisocyanate, 4,4'-dicyclohexyl diisocyanate, 1,2-di(isocyanatomethyl)cyclobutane, 1,3-bis(isocyanatopropoxy)-2,2-dimethyl propane, 1,3-bis(isocyanatopropyl)-2-methyl-2-propylpropane, 1-methyl-2,4-diisocyanatoclohexane, 1-methyl-2,6-diisocyanatocyclohexane, bis-(4-isocyanatocyclpropyl)-2-methyl-2-propylpropane, 1-methyl-2,4-diisocyanatocyclohexane, 1-methyl-2,6-diisocyanatocyclohexane, bis-(4-isocyanatocyclohexyl)-methane, 1,4-diisocyanatocyclohexane, 1,3-diisocyanatocyclohexane, isophorone diisocyanate, 2,6-diisocyanatocaproic acid ester, an isomeric mixture of 1-methyl-2,4-diisocyanatocyclohexane and 1-methyl-2,6-diisocyanatocyclohexane, 3,3,5-trimethyl-5-isocyanotomethylcyclohexylisocyanate, methyl-substituted hexamethylene- and pentamethylene diisocyanates, and the like. Other organic isocyanates well known to those in the art also may be used such as mixtures of 2,2'-, 2,4'-, and 4,4'-diphenylmethane diisocyanates and 2,4- and 2,6-toluene diisocyanates, crude isocyanates from the phosgenation of toluene diamine, and the like.

Also, quasi-prepolymers, such as the quasi-prepolymers of diphenylmethane diisocyanate may be used herein. These quasi-prepolymers and their methods of preparation are disclosed in U.S. Pat. No. 3,894,972, the disclosure of which is hereby incorporated by reference.

The polyisocyanate used herein are preferably, liquid. Liquid polyisocyanates may be prepared by means well known to the art. Thus, for example, liquid diphenylmethane diisocyanates may be prepared by producing carbodiimide-modified liquid diphenylmethane diisocyanates. Alternatively, one may prepare a quasi-prepolymer by reacting liquid diphenylmethane diisocyanate with an active hydrogen-containing compound by the techniques described in the aforementioned patent.

It is preferred in practicing the present invention to use a diisocyanate selected from the group consisting of toluene diisocyanate, hexamethylene diisocyanate, diphenylmethane diisocyanate, and the dimethyl derivative of diphenylmethane diisocyanate, and particularly, pure, modified, liquid diphenylmethane diisocyanate.

The carbodiimide-modified diphenylmethane diisocyanate may be prepared by the procedures described in U.S. Pat. No. 3,152,162; in German Pat. No. 1,092,007; in an article by T. W. Campbell and K. C. Smeltz appearing in *J. Org. Chem.*, 28, 2069 (1963); and in an article by D. J. Lyman and N. Sadri apearing in Madromel. Chem., 67, 1 (1963). Each of the patents and publications referred to in this paragraph is hereby incorporated by reference into this specification.

In practicing the present invention, the polyisocyanate ordinarily has a free NCO content of from about 20 to about 31 percent, and, preferably, from about 23 to about 31 percent.

In the process of this invention, the organic polyisocyanate is reacted with a polyalkylene ether polyol. Suitable polyalkylene ether polyols which are well known to those skilled in the art may be used in this process. Thus, one may use the polymerization product of an alkylene oxide or of an alkylene oxide with a polyhydric alcohol. Any suitable polyhydric alcohol can be used such as, e.g., those disclosed in U.S. Pat. No. 3,894,972 for the preparation of hydroxyl-containing polyesters; the disclosure of said patent is hereby incorporated by reference. Any suitable alkylene oxide can be used to prepare said polyol such as ethylene oxide, propylene oxide, butylene oxide, amylene oxide, as well as mixtures of these oxides. The polyalkylene polyether polyols also can be prepared from other starting materials such as tetrahydrofuran and alkylene oxide tetrahydrofuran copolymers. Epihalohydrins such as epichlorohydrin, as well as aralkylene oxides, such as styrene oxide are useful. The polyalkylene polyether polyols can have either primary or secondary hydroxyl groups and, preferably, are polyethers prepared from alkylene oxides having from two to about six carbon atoms. The polyalkylene polyether polyols can be prepared by any known process such as, for example, the process disclosed by Wurtz in 1859 and *Encyclopedia of Chemical Technology*, Vol. 7, pp. 257–262, published by Interscience Publishers, Inc. (1951) or in U.S. Pat. No. 1,922,459.

In the process of this invention, from about 0.8 to about 1.2 equivalents of polyol per equivalent of polyisocyanate are used. The polyol, preferably, has an average functionality of from about 2 to about 8 and an average equivalent weight of from about 1000 to about 2700. It is preferred to use from about 0.9 to about 1.1 equivalents of a polyol with an average equivalent weight of from about 1500 to about 2400.

Generally, the process hereof is carried out in the absence of blowing agent, but where used, non-aqueous blowing agents are used.

In order to produce the flexible microcellular foams, the polyisocyanate and polyol are reacted in together in the presence of an effective amount of certain specific diamines and/or tertiary amines.

Specifically, in the process of this invention, the polyisocyanate is reacted with the polyol in the presence of from about 0.1 to about 10 parts, and preferably, from about 0.1 to about 5.0 parts (by weight, per hundred parts of the polyol) of a nitrogen compound selected from the group consisting of

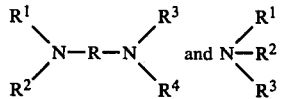

wherein R is a divalent alkylene radical containing from about 1 to about 4 carbon atoms; and $R^1$, $R^2$, $R^3$, and $R^4$ are independently selected from the group consisting of hydroxyalkyl containing from about 1 to about 4 carbon atoms and from about 1 to about 2 hydroxyl groups.

It is preferred that each of $R^1$, $R^2$, $R^3$, and $R^4$ contain from about 2 to 3 carbon atoms and 1 hydroxyl group. In a more preferred embodiment, each of said $R^1$, $R^2$, $R^3$, and $R^4$ groups contains 2 carbon atoms. It is also more preferred that R contain 2 carbon atoms.

The nitrogen compound used in the process of this invention may be prepared by means well known to those in the art. Thus, e.g., it may be prepared by reacting an alkylene oxide with an alkylene diamine under suitable oxyalkylation conditions.

In the process of this invention, the polyisocyanate is reacted with polyalkylene ether polyol and said nitrogen compound in the presence of from about 1 to about 35 parts (by weight, per hundred parts of said polyol) of a chain extender. In the preferred embodiment, from about 10 to about 25 parts of the chain extender are used in the process of the invention.

The chain extenders known to those in the art may be used in the process of this invention. Thus, e.g., the chain extenders described in U.S. Pat. No. 2,929,800 may be used; the disclosure of said patent is hereby incorporated by reference.

It is preferred that the chain extenders used in the process of this invention have a molecular weight of less than about 500 and are difunctional. By way of illustration and not limitation, some suitable chain extenders include, e.g., pentamethylenediamine, hexamethylene diamine, ethylene glycol, 1,3-propanediol, 1,4-butanediol, 1,5-pentanediol, 1,6-hexanediol, diethylene glycol, dipropylene glycol, and the like. It is preferred that the chain extender be selected from the group consisting of

wherein X and X' are independently selected from the group consisting of —OH, —NH, and —NH$_2$, R is alkylene of from about 2 to about 10 carbon atoms, and R' and R" are alkylene of from about 2 to about 4 carbon atoms. The most preferred chain extender is 1,4-butanediol.

The preferred polyurethane foam produced by the process of this invention employs from about 0.9 to about 1.2 equivalents of polyol per equivalent of isocyanate.

The present invention also contemplates the incorporation of additional ingredients in the foam formulation of tailor the properties thereof. Thus, one may use plasticizers such as, e.g., tris(2-chloroethyl)phosphate; inorganic fillers, pigments, and other additives well known to those skilled in the art. These additives may be mixed with the polyol, and the polyol-containing mixture then reacted with the polyisocyanate.

In producing the flexible microcellular foams hereof, the nitrogen compound may be used alone or in admixture with catalysts, such as the conventional urethane formation promoting organometallic catalysts well known to the skilled artisan. These catalysts, when used, are deployed in conventional amounts. It should be noted with respect hereto that the diamine employed for improving green strength, also, evidences catalytic activity herein, thus, reducing the need, where used, for other catalysts. However, conventional catalysts can be used conjointly with the diamine and enhance the quality of the foams produced therewith.

It has also been found in the practice hereof that conventional catalyst amounts of tertiary amines catalysts such as dimethylethanolamine may, also, be used in admixture with the green strength improving diamine or the triethanolamine.

Likewise, it is preferred that the foams be prepared in the absence of surfactants. However, where used, although not contemplated, the conventional silicone surfactants, i.e., alkylpolysiloxane and polyalkylsiloxane are used.

Following are examples which are presented to illustrate the claimed invention and are not to be deemed limitative thereof. Unless otherwise specified, all parts are by weight, all percentages are by weight, and all temperatures are in degrees centigrade.

In these Examples, the following terms are used:
Polyol 1—a blend of ethylene oxide capped polyols with an average hydroxyl number of about 25.
Compound A—N,N,N',N'-tetrakis(2-hydroxypropyl)ethylene diamine.
Compound B—Triethanolamine.
Compound C—Dimethylethanolamine.
Isocyanate 1—a modified, liqiud polyisocyanate based on pure diphenylmethane diisocyanate with a free NCO content of 25 percent.

Isocyanate 2—a modified polyisocyanate based on pure diphenylmethane diisocyanate with a free NCO content of 26 percent.

The physical properties of the foams prepared in these Examples were evaluated by standard tests known to those skilled in the art. The following tests were used:

| | |
|---|---|
| Density | A.S.T.M. D-792 |
| Tensile strength, tensile modulus, and elongation | A.S.T.M. D-412 |
| Split tear | A.S.T.M. D-1938 |
| Shore D hardness | A.S.T.M. D-2240 |
| Flexural modulus | A.S.T.M. D-790 |
| Flexural recovery | Materials Standard #CTZ ZZ003 Chevrolet Motor Standards, G.M.C. |
| Heat sag | Material Standard #CTZZZ006 Chevrolet Motor Standard, G.M.C. |

EXAMPLES 1–3

In these Examples, large molded plaques were prepared on a high pressure foam machine equipped with an 18 millimeter×90 millimeter head; 40 degree centigrade component temperatures were used. The total output was about 3.3 pounds per second. The initial mold temperature was 145 degrees Fahrenheit. The mold was an aluminum plaque which measured 36'×36"×⅛", and demold time was 1 minute. The samples were post-cured for 45 minutes at a temperature of 250 degrees Fahrenheit.

The formulations used in these Examples contained 100 parts (by weight) of Polyol 1, 22.5 parts (by weight) of 1,4-butanediol, 0.5 parts (by weight) of triethylene diamine, 0.03 parts (by weight) of dibutyltin dilaurate, and 3.24 parts (by weight) of compound A. The Isocyanate 1 was used at indices of 102, 105, and 108 for Examples 1, 2, 3, respectively.

The green strength of the molded polyurethane plaques was determined by bending over the corners of the molded plaques immediately upon demold and observing whether there was any cracking of the pad. No cracking was observed in any of the plaques of these examples.

| | Example 1 | Example 2 | Example 3 |
|---|---|---|---|
| Density, pcf. | 65.8 | 65.6 | 65.7 |
| Tensile strength, p.s.i. | 1770 | 1961 | 2043 |
| Elongation, percent | 209 | 212 | 227 |
| Split tear, p.i. | 112 | 134 | 150 |
| Die C Tear, p.i. | 435 | 470 | 493 |
| Shore "D" Hardness | 49–45 | 52–48 | 54–50 |
| Heat Sag, in. | 1.04 | 0.78 | 0.69 |
| Flex Recovery | 15/9 | 16/10 | 15/10 |
| Tangential Modulus, p.s.i. × $10^3$ | | | |
| −20° F. | 87.9 | 84.6 | 101.0 |
| 72° F. | 24.8 | 24.7 | 27.7 |
| 158° F. | 5.8 | 6.5 | 8.2 |
| Modulus Ratio | 15.10 | 12.99 | 12.35 |

COMPARATIVE EXAMPLE 4–6

The procedure described for Examples 1–3 was repeated with the exception that compound A was not used in these experiments and 24.5 parts of 1,4-butanediol were used. The Isocyanate 1 indices were 102, 105, and 108 for Examples 4, 5 and 6, respectively.

The green strengths of the molded polyurethane plaques were determined by bending over the corners of the molded plaques immediately upon demold and observing whether there was any cracking of the pad. All of the molded plaques of these examples exhibited cracking.

The physical properties of the polyurethane plaques are shown below.

| | Example 4 | Example 5 | Example 6 |
|---|---|---|---|
| Density, pcf. | 64.2 | 64.3 | 64.8 |
| Tensile strength, p.s.i. | 1673 | 1735 | 1848 |
| Elongation, percent | 305 | 308 | 290 |
| Split tear, p.i. | 154 | 185 | 209 |
| Die C tear, p.i. | 516 | 548 | 558 |
| Shore "D" hardness | 47–44 | 49–45 | 50–46 |
| Heat Sag, in. | 0.46 | 0.59 | 0.56 |
| Flex Recovery | 12/7 | 13/7 | 12/7 |
| Tangential Modulus, p.s.i. × $10^3$ | | | |
| −20° | 56.2 | 63.4 | 69.4 |
| −72° F. | 18.3 | 20.2 | 21.8 |
| 158° F. | 8.5 | 9.6 | 10.7 |
| Modulus Ratio | 6.67 | 6.64 | 6.51 |

EXAMPLES 7–18

A resin masterbatch was prepared for the experiments described in these Examples. This masterbatch contained 100 parts (by weight) of Polyol 1, 2 parts (by weight) of a 1:3 mixture (by weight) of triethylene diamine and 1,4-butanediol, and 0.03 part (by weight) of dibutyltin dilaurate, as a catalyst.

The formulation used in these Examples contained 102.03 parts (by weight) of the resin masterbatch, a specified amount of 1,4-butanediol, 100.2 parts (by weight) of Isocyanate 2, and a specified amount of Compound A. In Examples 7–9, 23.0 parts of 1,4-butanediol and 1.62 parts of Compound A were used. In Examples 10–12, 22.0 parts of 1,4-butanediol and 1.62 parts of Compound A were used. In Examples 13–15, 21.0 parts of 1,4-butanediol and 3.24 parts of Compound A were used. In Examples 16–18, 20.0 parts of 1,4-butanediol and 4.86 parts of Compound A were used.

In each of these experiments, the components were maintained at ambient temperatures, the mold temperatures were 130–139 degrees Fahrenheit, the in-mold time was 3 minutes, and the samples were post-cured for 30 minutes at a temperature of 250 degrees Fahrenheit.

The green strengths of these samples were determined by bending over the corners of the molded plaques immediately on demold and observing whether cracking occurred. Cracking was observed for each of the pads produced in Examples 7, 8 and 9. No cracking was observed for the pads of Examples 10–18.

The properties of the foams of these Examples were determined. They are shown in Table 1 and Table 2.

TABLE I

| | Example No. | | | | | |
|---|---|---|---|---|---|---|
| | 7 | 8 | 9 | 10 | 11 | 12 |
| Density, pcf. | 60.2 | 59.1 | 59.0 | 60.6 | 59.5 | 59.3 |

TABLE I-continued

| | Example No. | | | | | |
|---|---|---|---|---|---|---|
| | 7 | 8 | 9 | 10 | 11 | 12 |
| Tensile Strength, psi. | 2000 | 1780 | 1990 | 2180 | 2000 | 2100 |
| Elongation, % | 120 | 100 | 120 | 110 | 70 | 110 |
| Graves Tear, pi. | 350 | 325 | 350 | 325 | 325 | 337 |
| Shore "D" Hardness, Inst. 5 Sec. | 49 | 46 | 48 | 49 | 48 | 47 |
| Tangential Modulus, psi. | | | | | | |
| −20° F. | 46609 | 43571 | 44139 | 56924 | 48659 | 49779 |
| 72° F. | 14829 | 15982 | 17289 | 16987 | 17750 | 17818 |
| 158° F. | 9252 | 10157 | 10473 | 10435 | 10991 | 11131 |
| Modulus Ratio | 5.0 | 4.3 | 4.2 | 5.5 | 4.4 | 4.5 |

TABLE 2

| | Example No. | | | | | |
|---|---|---|---|---|---|---|
| | 13 | 14 | 15 | 16 | 17 | 18 |
| Density, pcf. | 58.6 | 59.5 | 58.9 | 59.2 | 58.4 | 58.1 |
| Tensile Strength, psi. | 1900 | 1900 | 2020 | 2100 | 2000 | 2000 |
| Elongation, % | 60 | 70 | 60 | 60 | 50 | 60 |
| Graves Tear, pi. | 312 | 325 | 300 | 300 | 312 | 287 |
| Shore "D" Hardness, Inst. 5 Sec. | 49 | 47 | 47 | 48 | 49 | 48 |
| Tangential Modulus, psi. | | | | | | |
| −20° F. | 66787 | 55858 | 56902 | 69691 | 64045 | 66006 |
| 72° F. | 18659 | 18339 | 17838 | 21346 | 21534 | 17351 |
| 158° F. | 9645 | 8711 | 9437 | 9690 | 11250 | 8460 |
| Modulus Ratio | 6.9 | 6.4 | 6.0 | 7.2 | 5.7 | 7.8 |

Additional experiments were conducted in substantial accordance with the procedure described in Example 1. However, comparable amounts of Compound C or Compound B were substituted for the Compound A used in Example 1.

It was found that the Compound B did improve the green strength of the foams of these experiments. However, the use of Compound C did not cause any substantial improvement in the green strength of the flexible microcellular foams.

Many other modifications and ramifications will suggest themselves to those skilled in the art; they are intended to be comprehended within the scope of this invention.

Having, thus, described the invention, what is claimed is:

1. A process for preparing a flexible, microcellular polyurethane foam with improved green strength, comprising:
    reacting together a polyalklyene polyether polyol having an average functionality of from about 2 to about 8 and an average equivalent weight of from about 1000 to about 2700, a chain extender and an organic polyisocyanate in the presence of an admixture of (1) a urethane—formation promoting organometallic catalyst and (2) an amine selected from the group consisting of N, N, N$^1$, N$^1$-tetrakis-(2-hydroxypropyl)ethylene diamine, triethanolamine and mixtures thereof, the amine being present in an amount ranging from about 0.1 to about ten parts by weight thereof per hundred parts by weight of polyol.

2. A process for preparing a flexible, microcellular polyurethane foam with improved green strength, comprising:
    reacting together a polyalkylene polyether polyol having an average functionality of from about 2 to about 8 and an average equivalent weight of from about 1000 to about 2700, a chain extender and an organic polyisocyanate in the presence of an amine selected from the group consisting of N, N, N$^1$, N$^1$-tetrakis-(2-hydroxypropyl)ethylene dimaine, triethanolamine and mixtures thereof, the amine being present in an amount ranging from about 0.1 to about ten parts by weight thereof per hundred parts by weight of the polyol.

3. The process of claim 1 wherein the amine is present in an amount ranging from about 0.1 to about five parts by weight thereof per hundred parts by weight of polyol.

4. The process of claim 2 wherein the amine is employed in a 1:1 equivalent weight ratio admixture with dimethylethanolamine.

5. The process of claim 2 wherein the amine is N, N, N$^1$, N$^1$-tetrakis(2-hydroxypropyl)ethylene diamine.

6. The process of claim 2 wherein:
    (a) the polyol has an average functionality of from about 2 to about 8 and an average equivalent weight of from about 1000 to about 2700;
    (b) the chain extender is 1,4-butanediol,
    and
    (e) the amine is N, N, N$^1$, N$^1$,-tetrakis (2-hydroxypropyl)ethylene diamine.

* * * * *